United States Patent [19]
Drees

[11] 3,845,917
[45] Nov. 5, 1974

[54] HELICOPTER VIBRATION ISOLATION

[75] Inventor: Jan M. Drees, Dallas, Tex.

[73] Assignee: Textron Inc., Providence, R.I.

[22] Filed: Feb. 12, 1973

[21] Appl. No.: 331,614

Related U.S. Application Data

[63] Continuation-in-part of Ser. No. 189,945, Oct. 18, 1971, abandoned.

[52] U.S. Cl. ............................. 244/17.27, 248/15
[51] Int. Cl. ........................................... B64c 27/00
[58] Field of Search ....... 188/1 B; 244/17.27, 17.25, 244/17.11, 137 R; 248/358 R, 15, 18, 20; 416/500

[56] References Cited
UNITED STATES PATENTS

| | | | |
|---|---|---|---|
| 2,569,882 | 10/1951 | De Bothezat | 244/17.25 |
| 3,379,397 | 4/1968 | Keady et al. | 248/20 |
| 3,698,663 | 10/1972 | Balke et al. | 244/17.27 |

Primary Examiner—Trygve M. Blix
Assistant Examiner—Paul E. Sauberer
Attorney, Agent, or Firm—Richards, Harris & Medlock

[57] ABSTRACT

A helicopter in which vibration is minimized by use of a lift unit including a multiblade helicopter main rotor system mounted to drive a nodalized module comprising structure which vibrates in response to blade developed vertical forces. A load unit is then connected to the vibrating structure only at vibration nodal points thereon.

26 Claims, 14 Drawing Figures

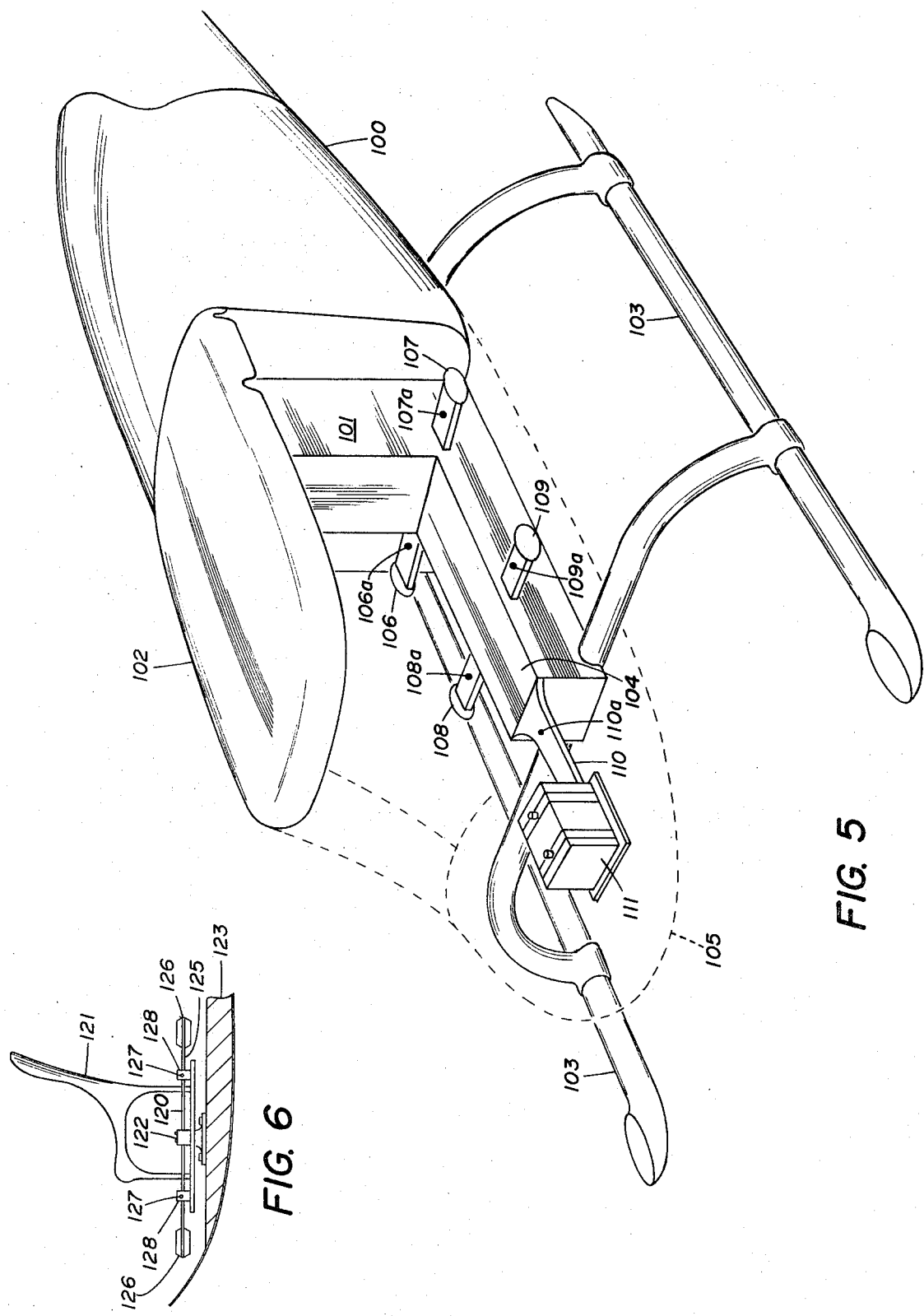

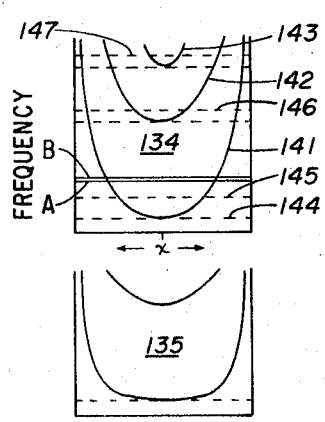
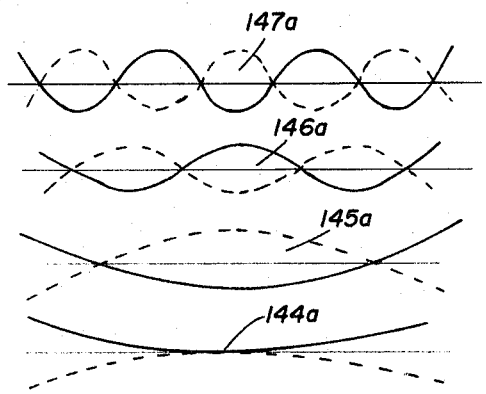
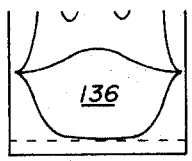
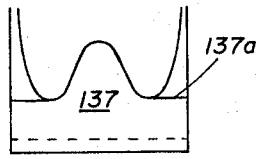
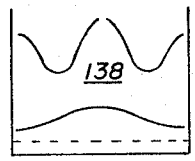
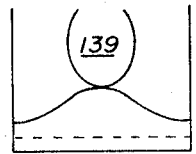
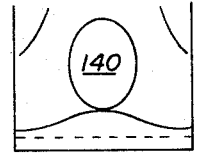
FIG. 7
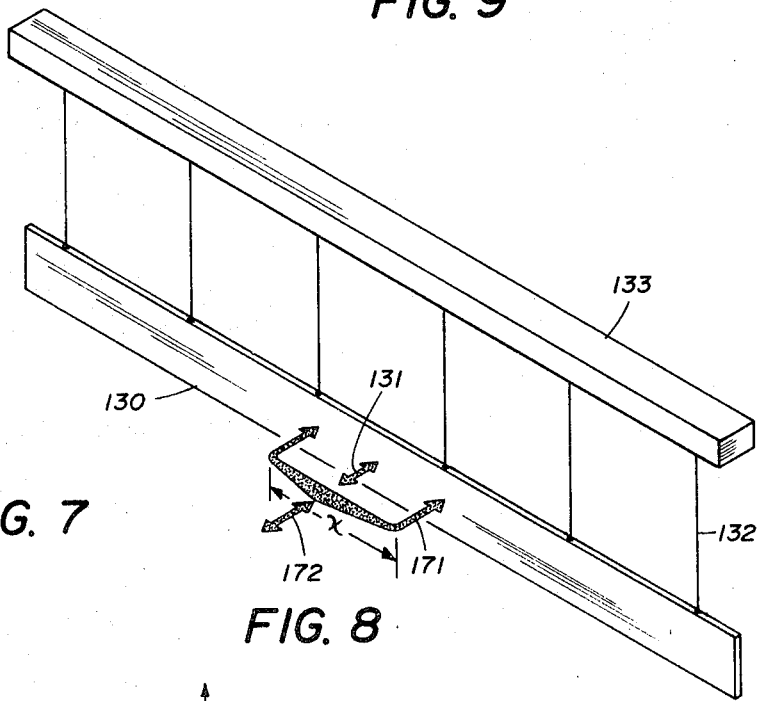
FIG. 9
FIG. 8
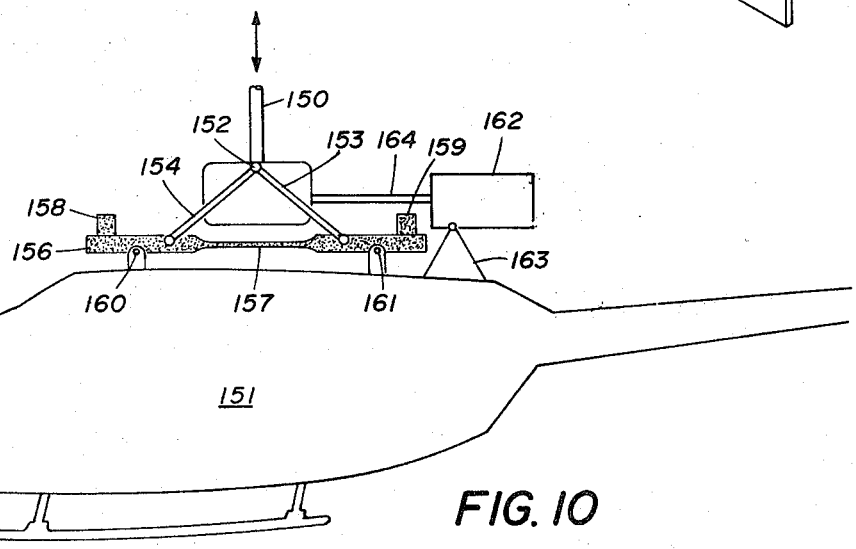
FIG. 10

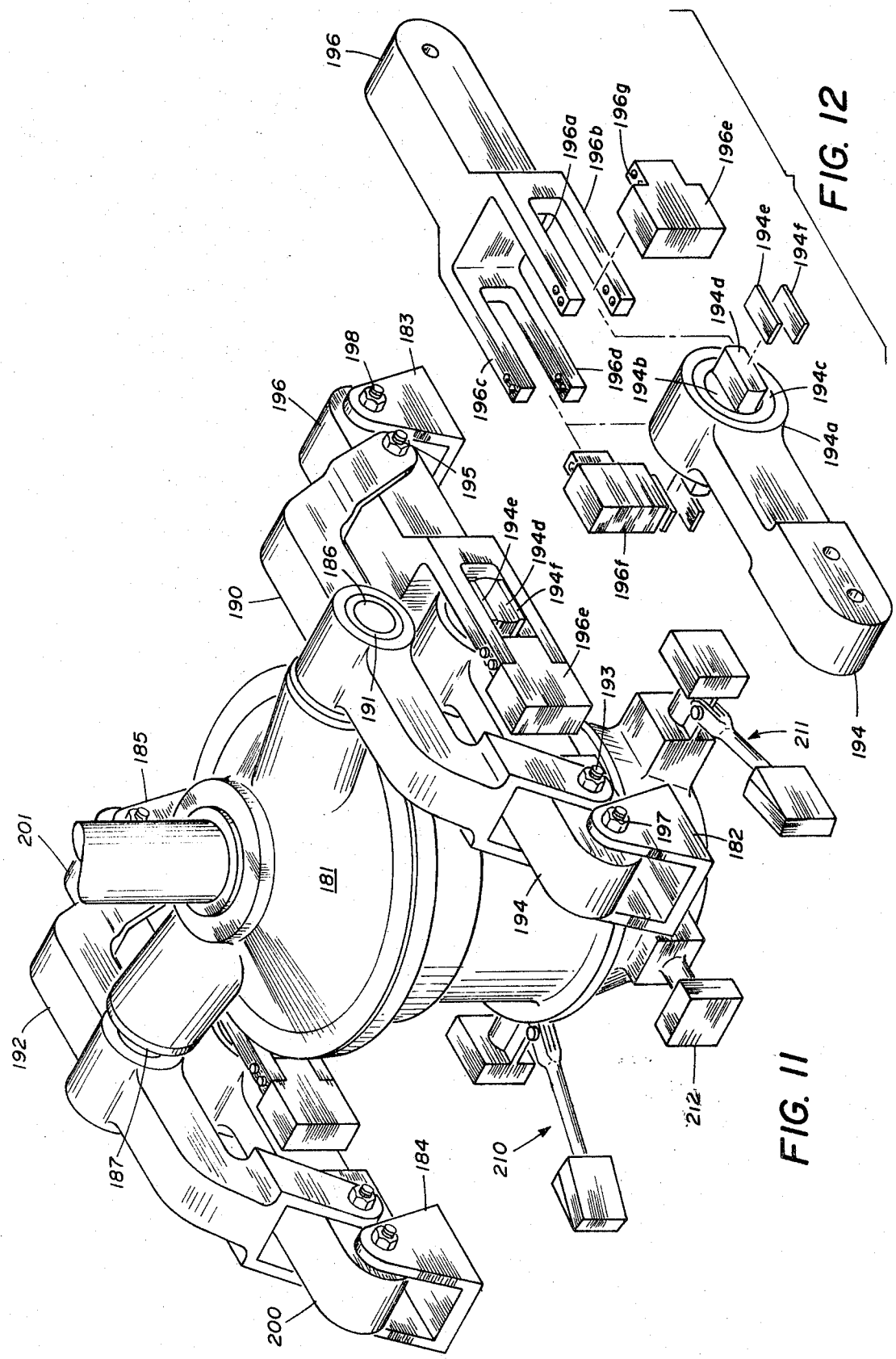

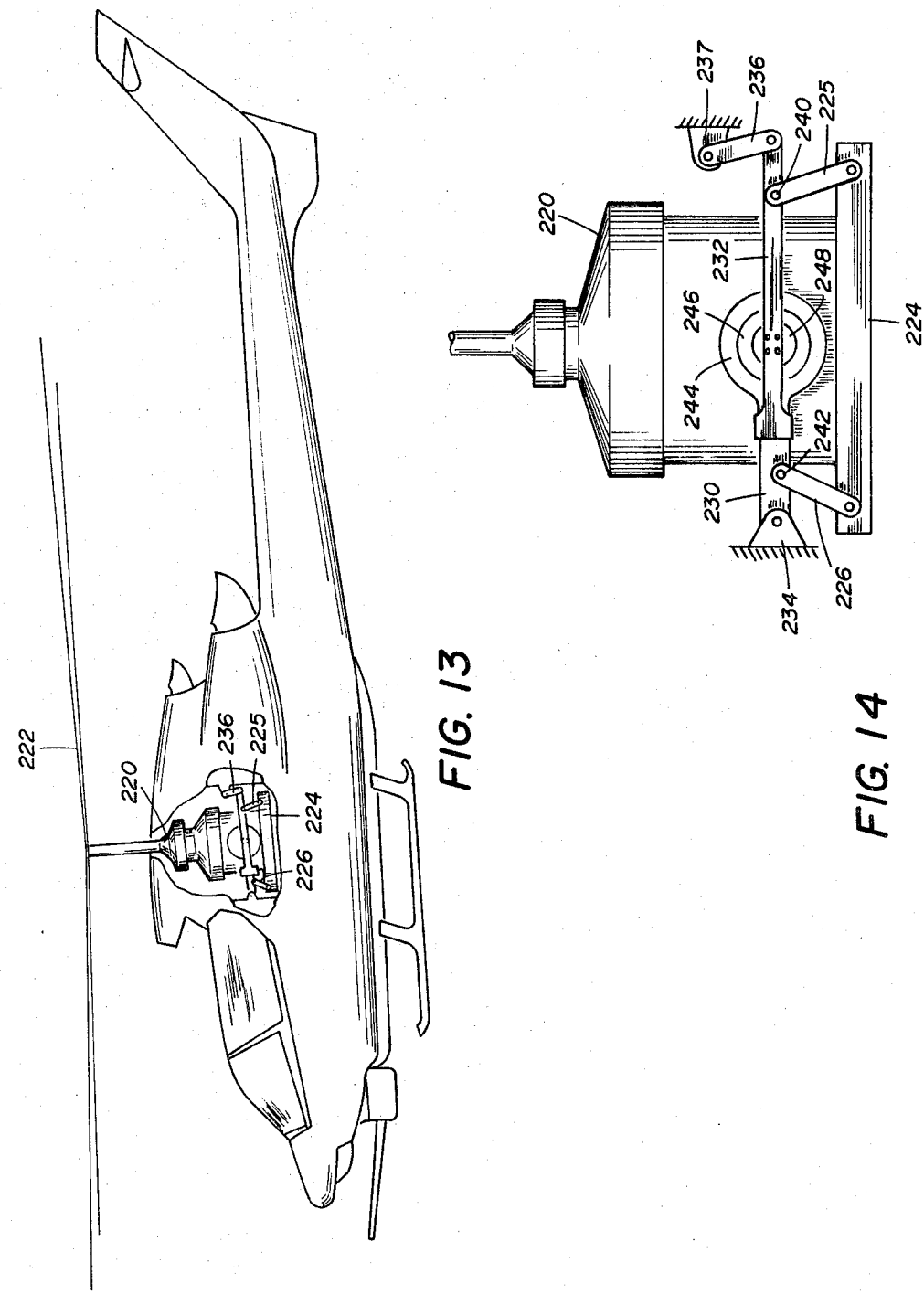

HELICOPTER VIBRATION ISOLATION

This is a continuation-in-part of U.S. Pat. application Ser. No. 189,945, filed Oct. 18, 1971 and entitled "Helicopter Vibration Isolation" now abandoned.

This invention relates to helicopters, and more particularly to isolation of load carrying structure from main rotor induced vibrations.

A significant barrier to extending the flight speed range of helicopters is the increase with speed of the vibration normally experienced by the crew, passengers and other loads. It has been an object to isolate the passenger and cargo areas from the dominant rotor harmonic. In a craft having a two blade rotor operated at rotor speeds of 300 cycles per minute, the dominant harmonic is two per rev or 10 cycles per second. A rotor and lift module may include most of the load supporting structure and most of the fixed weight. It is highly desirable that the fuselage containing pilot accommodations, cargo and fuel be isolated from rotor induced vibration. Dynamic antiresonant vibration isolation and other vibration reduction for helicopters traditionally has been an objective difficult to achieve. The steady increase in forward velocity over the years has contributed to the problem. Now for various reasons, the acceptable tolerance level is lower than it used to be. New requirements limit vibration levels to ±0.05g, whereas, the existing military specifications permit a level of ±0.15g, and many helicopters now flying vibrate more than ±0.20g in some flight regimes.

The best technical solution to a vibration problem depends much on the circumstances. An articulated rotor requires a different approach than a teetering rotor. Adjustments to stiffness and damping may be constrained by the need to avoid mechanical instability, excessive transient oscillations, or excessive static deflections. A number of new isolation systems have been proposed or used, such as a focused pylon described in U.S. Pat. No. 3,451,484 and passive isolators, in contrast to active isolators which require control and power to drive at the proper amplitude and phasing.

The inplane shear forces causing increased vertical vibration can be isolated by soft-mounting the pylon or by constructing a focused pylon system above mentioned. Difficulty has been encountered in isolating the fuselage from the vertical shear forces using this method. Another means of reducing vibration in the fuselage has been to modify the forced response mode shape of the basic fuselage by changing its stiffness and/or changing its mass distribution. A third method has been to change the fuselage mode shape by using a vibration suppressor. This method uses a fuselage mounted actuator to oscillate a mass in the vertical plane at a chosen rotor harmonic in order to produce a reaction to the rotor forces at that chosen harmonic. These latter two techniques benefit only certain areas of the fuselage.

Still another method has involved reduction of forcing functions through improved rotor design. However, this requires detailed and sophisticated rotor analyses generally not available.

Thus, prior methods include the following principles:

a. Design for a low fuselage response at the fundamental rotor frequency;

b. Employ plyon isolation by soft-mounting or focusing the pylon mount;

c. Forcing inflight node points into cabin area;

d. Reducing forcing functions by rotor flexures, use of rotor tip and rotor mid-weights, multiblade rotors and the like.

The present method involves a new and different structural relationship such that in one aspect the fuselage is attached only to the inflight nodal points of a nodalized lift module.

More particularly, the present invention provides isolation from the dominant rotor harmonics by transnodal isolation. This is accomplished through location of forced response nodes on a lift module at the dominant main rotor harmonic and the subsequent attachment of the fuselage to those nodal points. The selected nodal points are defined without reference to the fuselage and are spatial nodal points at the selected forcing frequency. Isolation is accomplished by suspending the fuselage on pin connections at the nodes which do not change the structural response. Variations in the weight of the fuselage do not significantly affect the locations of the nodes.

More particularly, in accordance with the invention, there is provided a helicopter having a lift module supported by a pylon and a main rotor and controls therefor. In such structure the main rotor induced vibration at a predominant frequency characteristically becomes more intense as forward speed increases. The fuselage is directly supported from the lift module only at nodal points thereon for the isolation of such vibrations from the load supporting structure.

In a further aspect, any subportion of the fuselage may be isolated by a coupling to the vibrating structure at nodal points.

For a more complete understanding of the present invention and for further objects and advantages thereof, reference may now be had to the following description taken in conjunction with the accompanying drawings in which:

FIG. 5 illustrates a further embodiment of the invention;

FIG. 6 illustrates vibration isolation of a cabin portion to support a seat;

FIG. 7 is a series of graphs showing various beam vibration states;

FIG. 8 illustrates beam drives to produce the vibrations represented in FIG. 7;

FIG. 9 illustrates different modes of vibration in the beam of FIG. 8;

FIG. 10 illustrates one embodiment of a nodalized helicopter;

FIG. 11 illustrates a nodalized coupling between a pylon and a fuselage;

FIG. 12 is an exploded view of one of the beams of FIG. 11;

FIG. 13 illustrates a further embodiment of a nodalized helicopter; and

FIG. 14 is a more detailed view of the fuselage mounting of FIG. 13.

Figure 1:
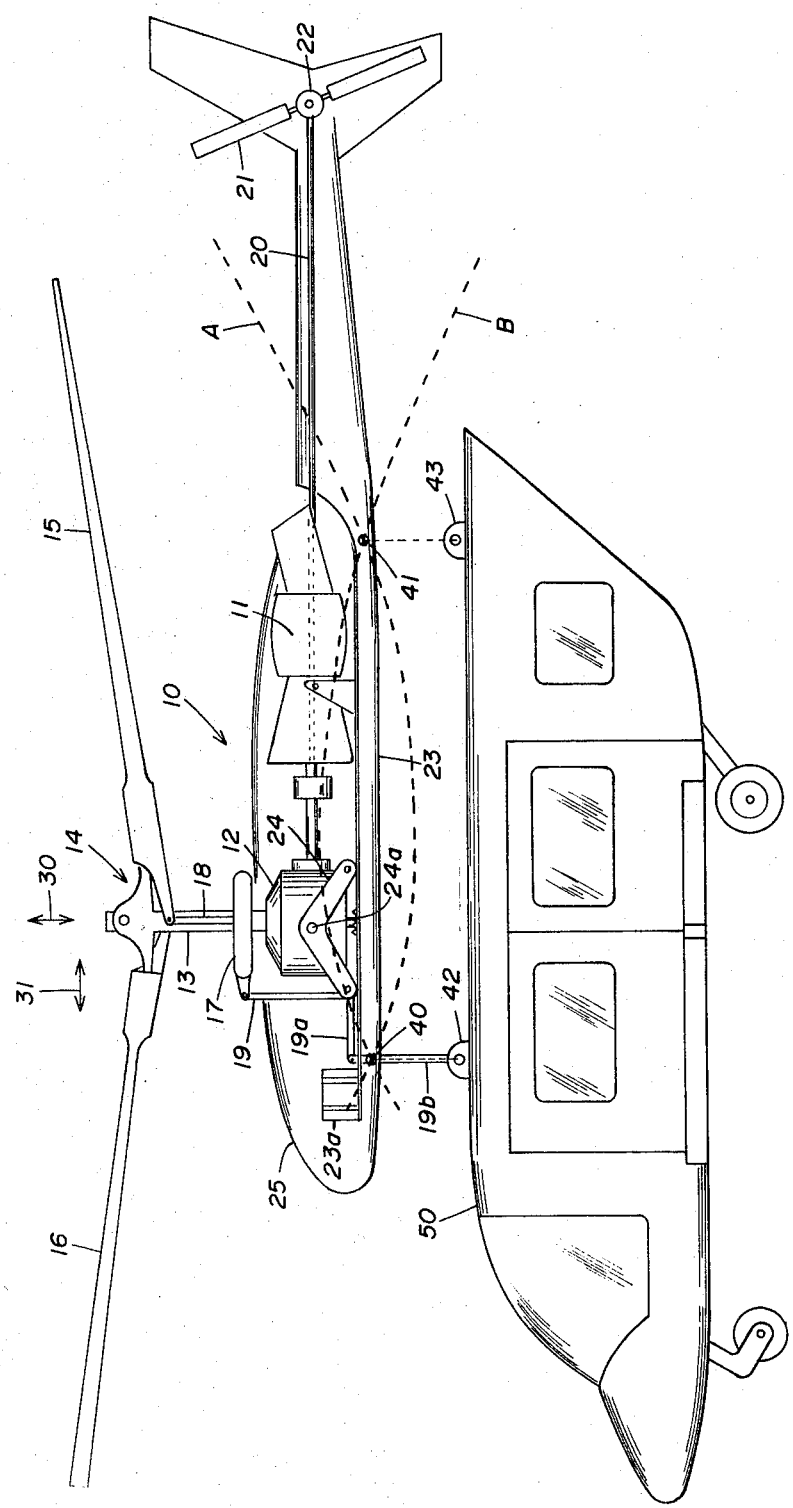
FIG. 1 illustrates one embodiment of the invention.

Referring to FIG. 1, an embodiment of the invention has been illustrated wherein a lift module 10 is provided with engines 11, a transmission 12, a pylon 13 supporting a main rotor 14 having blades 15 and 16. A swashplate 17 provides a means for controlling the pitch of blades 15 and 16 through linkage 18. A control linkage 19 extends to the cockpit and responds to the pilot's manual command. A drive shaft 20 extends through the body 10 to a tail rotor 21 mounted on shaft 22. The engines 11, transmission 12 and pylon 13, as well as shaft 20 and the tail rotor 21, are supported in module 10 by a beam 23. The transmission 12 preferably is mounted on beam 23 by way of a focusing yoke 24 such that shaft 24a is at the center of percussion of the pylon 13. The other components are similarly mounted in accordance with known practices.

Beam 23 extends forward beyond pylon 13 and transmission 12 to support other equipment, such as a battery 23a. Module 10 is covered with a streamlined housing 25 suitably apertured as to accommodate the components mounted on beam 23.

As a helicopter hovers, it is relatively free from vibration at a frequency of rotor 14. During forward motion vertical vibrations are induced into module 10 as indicated by the arrow 30, as well as forces indicated by arrow 31.

It has been found that the vibrations within the module 10, and particularly in the beam 23, are characteristic of a given structure. The response of one structure will differ from the response of any other different structure. In each case, however, nodal points, such as points 40 and 41 in FIG. 1, are detectable along the beam 23. The term nodal points as used herein are points at which there is a vibration null.

In accordance with the present invention, module 10 may be subjected to a forced response test at the dominant frequency to determine the locations of the nodal points. As indicated in FIG. 1, the nodal points 40 and 41 represent points at which the vibration induced by way of pylon 13 and transmission 12 are null. Dotted lines A and B represent, on an exaggerated scale, the relative magnitudes of vibrations along beam 23 when excited at a given frequency.

At points 40 and 41 a fuselage 50 may be pinned, rigidly and directly to the beam 23. Flanges 42 and 43 extending above fuselage 50 may be secured at points 40 and 41, respectively, by coupling pins. By this means fuselage 50 is rigidly secured to the module 10. When so coupled fuselage 50, the pilot, passengers fuel and baggage are free from the vibration which heretofore has been so intense in passenger and load carrying structures. An optimum rotor speed of around 300 cycles per second normally is maintained during flight so that in flight nodal points 40 and 41 have a fixed location for a given structure and will be substantially independent of the suspended load.

Collective and cyclic pitch control linkages represented by linkages 19a, 19b preferably lead from the swashplate 17 as to enter cabin 50 at the longitudinal location of the nodal points 40. This minimizes vibration of the control stick in the pilot's compartment.

From the foregoing, it will be seen that in one aspect of the invention, module 10 is designed and constructed and then subjected to a forcing function in a vibrating test system. Measurements made at points along the structure identify in flight nodal points. The load carrying structure is then attached to the nodal points.

The same results may be achieved by an analytical approach in which a given structural system is assumed as to dimensions, mass and stiffness. These factors may be assumed to be concentrated along an elastic axis of the lift module. Concentration of masses at grid points may be utilized to represent the mass of the module. To the elastic axis representation, lateral roof beams may be added to which the engines are to be attached. Such beams would be considered to extend laterally from a point under the mast to points representing the engine positions. The mast also can be represented by an elastic bar element with a mass concentrated at the top to represent the effective mass of the rotor. The rotor mass may be considered rigidly attached to the module to represent a rigid pylon configuration. From an assumed configuration, normal mode analysis for vibrations of such structures can be simulated on a computer. The location of the nodes thus identified may prompt changing the actual design of module 10, for example, so that the nodes will be distributed at points suitable for attachment of the load bearing structure.

Figure 2:
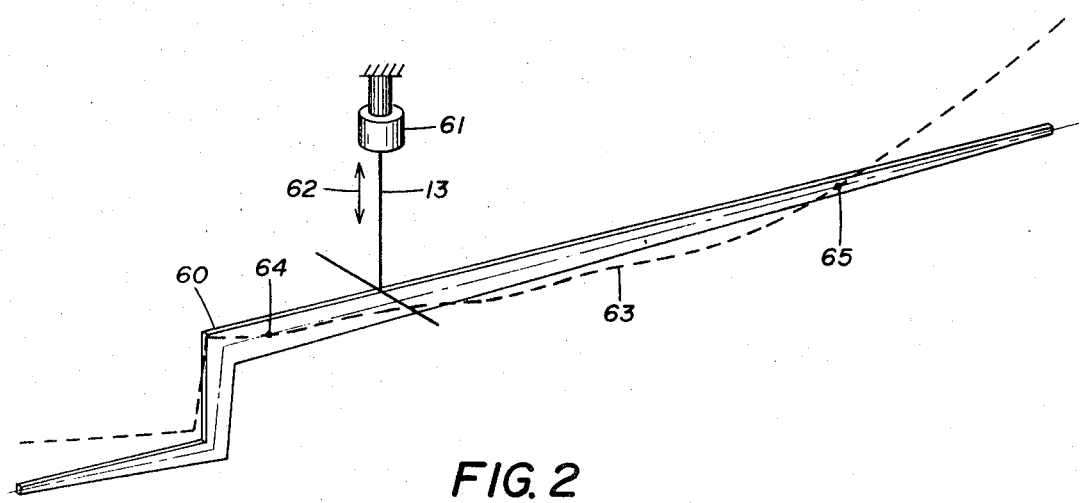
FIG. 2 illustrates a model of a unit employed in a design operation.

In one actual design operation, the results from such computer tests were embodied in a scale model of the type illustrated in FIG. 2 wherein a beam 60 is coupled to a suitable vertical driver 61 representing pylon 13 of FIG. 1. The driver was mechanically actuated to impart forces in the direction of arrow 62. The beam was dimensioned to simulate an actual aircraft. The application of vertical vibrations at the appropriate frequency scaled to represent two per revolution for the full sized aircraft were found to induce vibrations in the beam generally represented by the dotted line 63. It will be noted that along the length of the beam 60 there is a node point 64 and a node point 65. The vibration exhibiting two nodes may be referred to as a vibration in the first mode.

Nodes 64 and 65 may not occur at the locations appropriate for attachment of a load to a fuselage represented by beam 60. As the frequency of driver 61 is increased, beam 60 may be caused to vibrate in higher modes exhibiting three or more nodal points. The same effect can be provided, holding frequency constant, by changing the elastic properties of the structure. Thus, beam 70 of FIG. 3 will be assumed to have different size shape or elastic properties than beam 6. Vibrating at the same frequency as in FIG. 2, beam 70 may exhibit three nodes. For example, in FIG. 3 the nodes 66, 67 and 68 are present as the beam 70 vibrates in a second mode. Nodes 66 and 67 are more appropriately located for attachment of the load carrying structure than nodes 64 and 65 of FIG. 2. Dotted line 69 represents the relative magnitudes of the vertical vibration along beam 70. Accelerations, measured quantitatively, were 2.8g at the nose, 1.8g maximum between nodes 67 and 68 and 2.0g at the tail. In contrast, on a tray 71 attached to such nodes very low values of 0.08g, 0.2g and 0.05g were measured at the locations indicated in FIG. 3.

It will now be appreciated that the invention provides a significant aircraft design tool involving selection of the constants of a lift module so that in flight nodal points may be advantageously situated.

Figure 3:
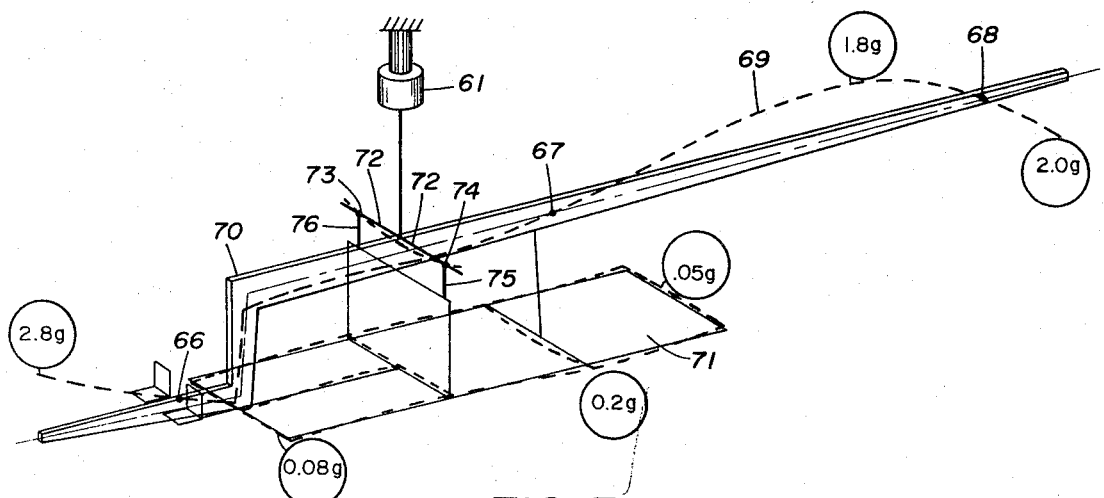
FIG. 3 illustrates a model involving the present invention.

In FIG. 3 load carrying tray 71 is supported by a suitable yoke from node 66. A crossbar 72 on the beam 70 extends laterally from the beam 70 to provide laterally spaced points for load attachment. The bar 72 represents an extension of the beam 70 and also exhibits nodal points 73 and 74 as it vibrates. Links 75 and 76 coupled to the bar 72 at points 73 and 74 provide vibration free support of tray 71.

Figure 4:
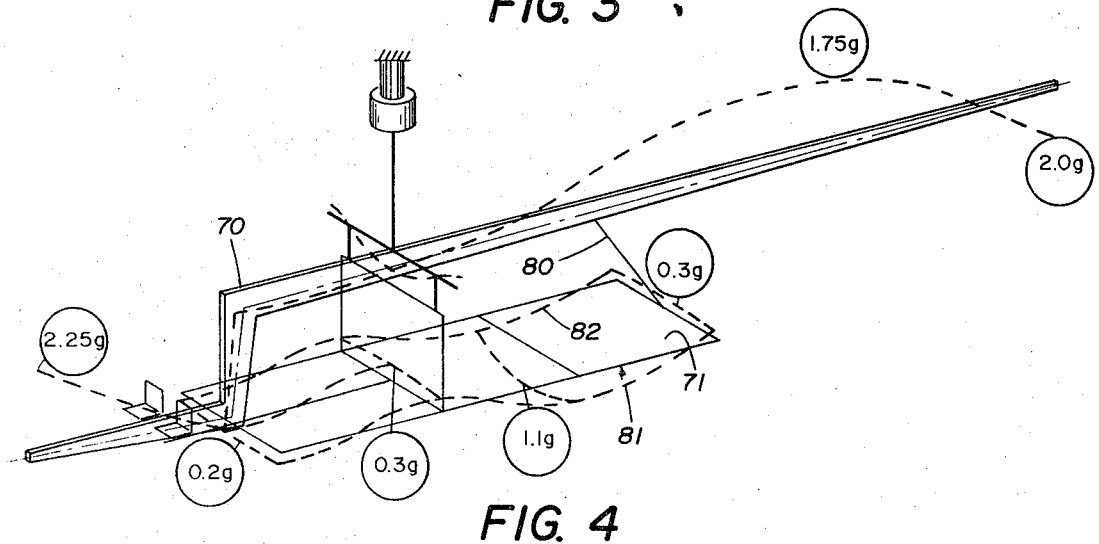
FIG. 4 illustrates a modification of FIG. 3.

In FIG. 4 vibration in the beam 70 is about the same level as in FIG. 3. However, the coupling of tray 71 has been modified by insertion of strut 80 between the trailing edge of tray 71 and beam 70. Because of the mere presence of strut 80, vibration in the tray 71 is greatly increased, illustrating the effect of couplings according to prior techniques. It will immediately be noted that the magnitude of acceleration in the beam itself is only slightly attenuated relative to the values illustrated in FIG. 3. At the same time, vibrations in the load carrying tray 71 are of greatly increased amplitude. The energy in beam 70 transmitted by strut 80 to tray 71 increases the level of acceleration in the tray 71 as indicated by the dotted lines 81 and 82 which represent the magnitude of accelerations measured in such a test along the edges of the tray 71. While values shown in FIG. 4 are relative, the applicability of the present invention to such an aircraft structure shows dramatic reduction in vibration of the load bearing structure.

In FIG. 5 a modification of the invention has been illustrated. A basic helicopter structure involving a body 100 has a main structural beam with a roof canopy 102 and landing skids 103. The main beam includes a vertical section 101 which represents an engine and pylon mounting portion. A horizontally extending section 104 is integral with the vertical section 101. The structure involved in beam 101, 104 vibrates in response to the rotor induced force as above described.

In accordance with this embodiment of the invention, a cabin structure represented by the dotted outline 105 is fitted to mate with canopy 102 and be supported by section 104. More particularly, cantilever beams 106 and 107 extend laterally from section 104 in the rear portion of the cabin receiving area. Beams 108 and 109 extend laterally from section 104 at the front of the cabin receiving area. Beams 106–109 each vibrates and may be so dimensioned as to exhibit in flight nodes at points 106a–109a. The cabin structure 105 may then be pinned to the beams 106–109 at points 106a–109a.

A beam section 110 extends forward from section 104 and is integral therewith but of smaller section. A battery 111, for example, or other such load, may be mounted on the end of beam 110. Beam 110 may thus be so dimensioned and loaded as to exhibit a nodal point at point 110a. At this point, fulcrums or other linkages may be secured, leading to the rotor controls thereby to isolate the controls operated by the pilot in the cabin from the vibrational forces. Thus, in each case the mountings of the load bearing portions of the system may be rigidly and directly secured to the airframe structure. Even though the airframe is in intense vibration, the load bearing portion of the craft will be isolated from such vibration.

In FIGS. 1 and 5 the vibration free support of an entire cabin structure together with its fuel, personnel and baggage facilities is contemplated. Mounting of subsections, such as a pilot seat or a gunner's seat, may also be achieved free from vibration of the remainder of the craft. More particularly, in one installation an aircraft seat was mounted as illustrated in FIG. 6. A base 120 was provided for the support of a seat 121. A set of posts, such as post 122, was mounted on the floor 123 of a helicopter cabin. Cantilever beams 125 were mounted on post 122 with suitable weights 126 thereon so that an in flight node was established at points 127. A clamp 128 was then provided for supporting base 120 from bar 125 at each nodal point 127. A three point mounting utilizing an additional bar provided for isolation of the seat 121 from the remainder of the structure.

Application of the present invention to the system shown in FIGS. 1–6 will be further understood by reference to FIGS. 7–9 where the principles of nodalization are illustrated. In FIG. 8 a beam 130 is suspended by cords 132 from a rigid support 133. When such a simple elastic beam 130 is excited by a vibratory force 131 applied at the center of the beam 130, nodal points can be observed if the forcing frequency is above a certain value. In FIG. 7 the upper plot 134 represents the vibration of beam 130 when force 131 is applied at the center of the beam. Points of zero vibration, i.e., node points, in the horizontal plane resulting from force 131 comprise the plot 134. The abscissa for plot 134 is the beam station at which measurements of vibration are made. The center point on beam 130 corresponds to the center line of plot 134. The ordinates are plotted in terms of frequency with zero frequency at the bottom of the plot.

As the frequency of force 131, FIG. 8, increases, the location of the node points along beam 130 change. Curve 141 represents the location of the most outward node points. Curve 142 represents the location of a second set of modes which appear when vibrating in the second symmetric mode and curve 143 represents nodes associated with the third symmetric mode. The frequency at which line 144 is tangent to curve 141 is generally known in the art relating to vibration in simple beams as the first Frahm damper mode. At any frequency above the frequency of line 144, the beam will exhibit at least two vibration nodes, i.e., zero movement.

In accordance with the present invention, for the simple beam of FIG. 8, the preferred operating range is represented by the range of frequencies spanned by the bar A–B. When the beam 130 is excited at frequencies within bar A–B, two nodes will be exhibited at the beam located at stations corresponding to the intersections between curve 141 and the operating drive frequency within bar A–B. The operating frequency is chosen away from the natural frequencies of the beam.

In FIG. 9 the amplitude of vibration of the beam 130, FIG. 8, has been illustrated in plot 144a, representing the first Frahm damper mode. No motion occurs here at the center of the beam where the force is applied.

Plot 145a represents the first symmetric mode as exhibited at a frequency 145, which is the natural frequency of the first mode.

Plot 146a represents the second symmetric mode such as exhibited at the natural frequency 146, FIG. 7.

Plot 147a illustrates vibration in the third symmetric mode, for example at the natural frequency 147, FIG. 7.

It is important to note that the nodal points cross the natural frequencies smoothly. At definite frequencies, the response of the beam becomes zero at the point of excitation.

It is evident from plot 134, FIG. 7, that it is possible to operate away from natural resonant frequencies in order to reduce the amplitude of the response, reducing structural loads on beam 130 with well-defined nodal points existing. Such considerations would normally lead to design a structure with a low natural frequency. On the other hand, in the case of a helicopter the structure must carry static loads with minimum deflection. This requirement tends to give the structure a high natural frequency. These two requirements, a high natural frequency, i.e., stiff beam, and low natural frequency, i.e., low response, are both satisfied in the present invention when the ratio of forcing frequency to natural frequency of the first mode is between 1.1 and 1.5. The forcing frequency is a function of the main rotor speed and the number of rotor blades. In examples of the systems of FIGS. 1–6, the frequency as mentioned above is two cycles per revolution of the rotor for two bladed rotors, although the same rules apply for $n$ per rev for $n$ bladed rotors. It has been determined that this rotor speed can vary more than customary operational practice would permit without shifting the nodal points appreciably.

In airframe construction, any weights attached to the in flight forced nodal points do not oscillate and do not alter the dynamics of the beam at the forcing frequency. The nodes cannot transmit oscillating forces to the supported load. Therefore, isolation is not a function of load. It is recognized that any damping will cause quadrature-phased motion of the beam. This would tend to eliminate nodes. However, it is possible to identify regions of low response on the beam. It takes large amounts of damping to eliminate usefulness of such regions for load supporting purposes.

The object of the invention then is to make use of in flight nodes by suspending loads from them. A significant advantage of this method over conventional soft mounting techniques is that much stiffer structure can be maintained with lower transmissibility. This is particularly important where controls and drive shafts, which can accommodate only limited relative motions, are attached to the moving pylon at one end and to the fuselage at the other end. This invention may be viewed as locating the in flight nodes with the loads detached and then attaching the loads to the nodal points.

From the plot 134, particularly curve 141, it will be noted that so long as the force 131, FIG. 8, is applied at a single point or effectively at the center of the beam, there can never be nodal points at the end of beam 130. This is for the reason that the curve 141 is asymptotic. There always must be some weight-beam portion beyond the nodal points of a center driven beam. Such an arrangement is diagrammatically illustrated in FIG. 10. In FIG. 10 pylon 150 supports fuselage 151 from shaft 152. Links 153 and 154 are tied to a nodalized beam 156. The beam has a thinned center section 157 that is tailored with weights 158 and 159 to provide in flight nodes at points 160 and 161. In this embodiment, an engine 162 is supported on fuselage 151 by way of mounting 163. Engine 162 is coupled by way of shaft 164 to the pylon 150. In practice, two beams such as beam 156 could be employed, one on each side of the pylon 150 so that four in flight nodes are employed for attaching the fuselage 151 to the nodalized beam system at four points.

Although beam 156 is not a simple beam, it operates in accordance with the first symmetric mode above described because weights 158 and 159 are outside links 160 and 161.

In practice, the structure associated with pylon 150, FIG. 10, may not all be conveniently positioned above the roof of the aircraft and for this and other reasons there may be rigid limitations on the length of beam 156. It has been discovered that there are advantages to operating in modes other than that represented by plot 134, FIG. 7. This stems from the fact that any nodalized beam which will serve to isolate the fuselage from a lift module must contain weights against which the vertically vibrating pylon must work. For example, in FIG. 10, weights 158 and 159 serve to oppose the vertically moving or vibration pylon. It has been found desirable not only to shorten the beam 156 but to have the weights located between links 160 and 161. When this can be done, the magnitude of vibration of the pylon 150 relative to the motor 162 will be minimized, thereby simplifying the coupling required between shaft 164 and motor 162 on one end and the pylon 150 on the other end. Also simplified will be the couplings between the control linkages. An understanding of the approach to such a system will be gained from considering the plots 135–140, FIG. 7. These plots are representative of data obtained from applying forcing functions to beam 130 of FIG. 8 but with the function being applied at a pair of spaced points such as represented by member 171 which is in the form of a yoke actually driven by a force 172. The distance $x$, FIG. 8, represents the spacing between the points of application of the force 172 to beam 130. The spacing $x$ represents the spacing along the abscissa in FIG. 7. The purpose of plots 135–140 is to illustrate the variations in the vibration characteristic of the simple beam case, the center driven case represented by plot 134, as the spacing $x$ is increased.

Plot 135 represents the vibration of beam 130 for a fairly small value of $x$.

For increased spacing, plot 136 is characteristic of the change in node point locations.

In plot 137, it will be noted that at the frequency 137$a$ there will be nodes at the ends of the beam.

For all spacings $x$, wider than that representing the plot 137, i.e., plots 138–140, there will be nodes at the beam ends. This condition makes it possible to shorten the beam and at the same time locate the working weight portions of the beam between the nodes at which the fuselage is coupled.

One embodiment of such a mounting is illustrated in FIG. 11 where the nodalized module merely comprises a pair of beams mounting the pylon. In FIG. 11 only the portion of the system between the pylon 181 and the clevises 182–185 which are integrally connected to the fuselage have been illustrated. More particularly, pylon 181 provides support for the fuselage through two shafts 186 and 187. The shafts 186 and 187 extend athwartship and are located such that their axis passes through the center of percussion of the pylon 181. While axes 186 and 187 have been shown, they preferably will terminate in a ball working in a socket in the yokes now to be described.

A yoke 190 is mounted on shaft 186 by a bearing 191. A yoke 192 is mounted on shaft 187. Yokes 190 and 192 extend parallel to the longitudinal axis of the aircraft. Yoke 190 is coupled by pin 193 to an intermediate point on a first beam segment 194. Pin 195 connects the other end of yoke 190 to an intermediate point on a second beam segment 196. Segment 194 is connected by way of pin 197 to clevis 182 which is integral with the fuselage. Segment 196 is connected by way of pin 198 to clevis 183 which is integral with the fuselage.

In a similar manner, beam 192 is connected to intermediate points on beam segments 200 and 201. Segments 200 and 201 are pinned to clevises 184 and 185 which are integral with the fuselage on the side of the pylon 181 opposite clevises 182 and 183.

It will now be appreciated that the couplings between the beams and the fuselage are at the ends of the beams. The forcing functions are applied to each beam at two points near the ends of yokes 190 and 192. More particularly, beam drive points 193, 195 are near the fuselage coupling points 197, 198, respectively.

The structure of beams 194, 196 is best seen in the exploded view of FIG. 12. Segment 194 is provided with a transverse bearing housing 194a. A shaft 194b is journaled in housing 194a in an elastic or rubber cylinder 194c. Bearing 194c is adhesively secured to housing 194a and to shaft 194b. Shaft 194b has rectangular ends 194d.

Segment 196 has a pair of tines 196a and 196b on one side and a pair of tines 196c and 196d on the other side forming a recess into which the housing 194a may be inserted. The spacing between tines 196a and 196b is greater than the thickness of the rectangular end 194d. Weights 196e and 196f are adapted to fit onto the ends of tines 196a and 196b and to be secured thereon by pins through holes 196g. Flat rubber bearings 194e and 194f are adapted to be secured to the top and bottom faces of the rectangular end 194d and to the inner faces of the cooperating tines. Thus, end 194d is coupled to segment 196 by the flat rubber pads 194e and 194f.

The cylindrical rubber bearing 194c provides the spring constant for the beam comprising elements 194 and 196. The rubber pads 194e and 194f permit longitudinal movement between boss 194d and tines 196a and 196b. Such longitudinal movement is necessary when the beam vibrates in response to the forcing functions applied from yoke 190.

It will now be seen that in FIG. 11 the mass against which the pylon must operate is located inside the nodal points 197 and 198. Further, such mass, which for the present discussion may be characterized as weights 196e and 196f, FIG. 12, vibrates or moves in the same direction at any instant as pylon 181. By this arrangement, the movement of pylon 181 relative to clevises 182 and 183 is less than it would be if the weights were outside the nodal points. This distinct advantage results from applying the forcing functions at points spaced in the manner represented in FIG. 8 by the arrows 171. In the present instance, the points to which the forcing function is applied, the pins 193 and 195, are very close to the nodal points 197 and 198. By this means, the center portion of the beams 194-196 may vibrate with high amplitude compared with the amplitude of movement of the pylon 181.

It will be appreciated that the beam 194-196 could be made integral, somewhat like the beam 156, FIG. 10. The coupling arrangement in FIG. 11, however, is preferred in that it simplifies the mounting problems by accommodating longitudinal movement of the rectangular 194d relative to segment 196.

By way of further explanation as to structure shown in FIG. 11, it will be understood that the linkages 210, 211 and 212 are conventional linkages employed in order to oppose inplane forces due to tilting forward and aft of the pylon. The ends of the linkages 210-212 are connected to the fuselage (not shown).

Lateral tilting of the pylon 181 automatically is taken care of in the system of FIG. 11. As the axis of shafts 186 and 187 tilts laterally, such tilt will be accommodated by relative change in the attitudes of beam 194-196 relative to beam 200-201 without modifying the nodalizing thereof.

FIGS. 13 and 14 illustrate a further modification of the invention illustrated in FIGS. 11 and 12. In FIG. 13, the pylon 220 supported by rotor 222 in turn is supported from its base 224 by focal linkages 225 and 226 from a nodalized beam. As best shown in FIG. 14, the beam on one side of the pylon 220 comprises two segments 230 and 232. A like beam is provided on the other side of pylon 220. Segment 230 is connected by way of clevis 234 to the aircraft fuselage. Segment 232 is connected by way of links 236 to a clevis 237 which is integral with the fuselage. The pylon 220 is connected by link 225 to point 240. Link 226 is connected to point 242. The ends of the beams 230 and 232, where they attach to clevis 234 and link 236, are nodal points.

The segment 230 is integral with a cylindrical bearing housing 244 in which there is mounted a rubber cylindrical bearing 246 which encompasses a shaft 248. Shaft 248 is integrally connected to segment 232. Thus, the rubber bearing 246 provides the spring constant for the beam structure. The linkage 236 together with linkages 225 and 226 accommodate those changes in length of the beam 230-232 which occur under vibration. This permits elimination of the structure involving pads 194e and 194f of FIG. 12 at the same time that it locates the weight portions of the system between the node points at the ends of the beam 230-232.

The foregoing description has dealt primarily with a single rotor or two-bladed helicopters such as shown in FIG. 1. It will be understood, however, that the invention is applicable to multirotor and multibladed helicopters and the like wherein such rotor induced vibrations are to be isolated.

Having described the invention in connection with certain specific embodiments thereof, it is to be understood that further modifications may now suggest themselves to those skilled in the art and it is intended to cover such modifications as fall within the scope of the appended claims.

What is claimed is:

1. A helicopter having a load supporting structure which comprises:
   a. a lift module including a pylon, main rotor, and controls therefor in which main rotor induced vibration at a predominant frequency becomes more intense as forward speed increases, and
   b. a load carrying structure directly supported from said lift module only at nodal points on said lift module for the isolation of said vibration from said load carrying structure.

2. The system of claim 1 wherein at least one cantilever beam is rigidly secured to and vibrates when said lift module to exhibit a node at said frequency at a desired load attachment location and wherein said load carrying structure is secured to said nodes in said lift module including at least one connection at a node in the cantilever beam.

3. The system of claim 2 wherein a plurality of such cantilever beams are provided and load attachments are solely at nodes in said beams.

4. A helicopter having a load supporting structure which comprises:
   a. a lift module subject to main rotor induced vibration at a predominant frequency, and
   b. a load carrying structure secured to said lift module only at nodal points thereon for the isolation of said vibration from said lift module.

5. A load support system in a helicopter for minimizing vibration of a load carrying portion which comprises:
   a. a lift module comprising a helicopter fuselage complete except for said load carrying portion, which module vibrates characteristically at the frequency of the normal cruise rotor speed multiplied by the number of rotor blades to exhibit rotor induced vibration nodes at spaced locations in said module, and
   b. means for rigidly attaching said load carrying portion to said module only at said nodes.

6. The method of load support in a helicopter for minimizing vibration of a load carrying portion which comprises:
   a. establishing a structural relationship of a lift module, which module vibrates characteristically at the frequency of the normal cruise rotor speed multiplied by the number of rotor blades to exhibit rotor induced vibration nodes at spaced locations in said module, and
   b. attaching said load carrying portion to said module only at said nodes.

7. The method of load support in a helicopter for minimizing vibration of a load carrying portion which comprises:
   a. establishing a structural relationship of a lift module comprising a fuselage complete except for said load carrying portion,
   b. establishing the vibration characteristic of said module at the frequency of the normal cruise rotor speed multiplied by the number of rotor blades to identify the location of rotor induced vibration nodes in said module, and
   c. attaching said load carrying portion to said module only at said nodes.

8. A helicopter which comprises:
   a. lift means including a multiblade helicopter main rotor system,
   b. a nodalized module including a beam means driven in response to blade developed vertical forces, and
   c. a fuselage unit connected to said beam means only at vibration nodal points along said beam.

9. The combination set forth in claim 8 wherein a pair of beams are provided extending longitudinally relative to said fuselage unit and on opposite sides of the axis of said rotor system.

10. The combination set forth in claim 9 wherein said rotor system is centrally connected to each of said beams and wherein said fuselage unit is connected to two node points located on each of said beams intermediate the beam center and the beam ends.

11. The combination set forth in claim 9 wherein said beams are connected to said lift means at two points on each beam, said points being located near opposite ends of said beam and wherein said fuselage unit is connected to said beams at the ends of each of said beams.

12. The combination set forth in claim 8 wherein said beam means is characterized by couplings in the beam centers with spring means for control of the spring constant of said beam means.

13. The combination set forth in claim 8 in which said lift means includes a pylon supporting said multiblade rotor, said fuselage unit includes a helicopter engine with a drive shaft coupling said engine to said pylon on an axis generally parallel to the plane of said rotor.

14. The combination set forth in claim 8 in which said beam is formed of two rigid parts extending toward one another from said nodal points and wherein the confronting ends of said parts are interconnected by spring means of predetermined spring characteristics.

15. A helicopter which comprises:
   a. lift means including a multiblade helicopter main rotor system,
   b. a nodalized module including a beam driven in response to blade developed vertical forces to establish vibration nodes at at least two spaced apart points in said beam, said beam having weight portions spaced from said nodal points against which said vertical forces work in establishing said nodes, and
   c. a fuselage connected to said beam only at vibration nodal points in said beam.

16. The combination set forth in claim 15 in which said weight portions are located on said beam at end locations, said beam is driven by said vertical forces at a mid beam location and said node points are located intermediate said end locations and said mid beam location.

17. The combination set forth in claim 15 in which said weight portions are located on said beam on the same side of the nodal points as the point of application of vertical forces.

18. A helicopter which comprises:
   a. a lift means including a multiblade helicopter main rotor and a pylon connected thereto,
   b. a beam connected to said pylon to establish vibration nodes in said beam in response to vertical forces developed by rotation of said main rotor, and
   c. a fuselage connected to said beam at the vibration nodal points located on said beam at predetermined spaced points relative to the ends of said beam.

19. The combination set forth in claim 18 in which said points are at opposite ends of said beam.

20. The combination set forth in claim 18 in which said points are spaced inwardly of the ends of said beam and wherein said beam is connected to said pylon centrally of said beam.

21. A helicopter nodalized to minimize transfer of vibration from the rotor-pylon structure to the fuselage which comprises:
   a. aligned shafts extending laterally of said fuselage from opposite sides of said pylon,
   b. two yokes, one on each side of said pylon and centrally connected to said shafts, c. two flexible beams extending longitudinally of said fuselage, one on each side of said pylon and each coupled to ends of said yokes at beam drive points intermediate the ends of said beams,
d. means to couple said fuselage to said beams at nodal points outside said drive points, and
e. power means to drive said pylon from said fuselage.

22. The combination set forth in claim 21 in which said beam is centrally articulated with a coupling therein of predetermined spring constant.

23. The combination set forth in claim 21 in which said shafts are at the center of percussion of said pylon.

24. The combination set forth in claim 21 in which a weight is connected to said beam between said beam drive points.

25. The combination set forth in claim 21 in which said coupling includes a rubber body adhered to a housing formed on one part of each of said beams and a shaft secured to a second part of each of said beams extending coaxially within said housing and adhered to said rubber body.

26. A nodalized helicopter which comprises:
a. a helicopter fuselage,
b. a beam extending in a plane generally parallel to the longitudinal and lateral axes of said fuselage,
c. a rotor and pylon connected to apply vertical rotor generated forces to said beam thereby establishing vibration nodes in said beam, and
d. means connecting said fuselage to said beam only at said nodes.

* * * * *